US012750213B2

(12) United States Patent
Adjedj et al.

(10) Patent No.: US 12,750,213 B2
(45) Date of Patent: Sep. 29, 2026

(54) METHOD FOR SECURELY TRANSFERRING DATA ELEMENTS VALUES

(71) Applicant: THALES DIS FRANCE SAS, Meudon (FR)

(72) Inventors: Michael Adjedj, Creteil (FR); Véronique Charpeignet, Toulon (FR); Aline Gouget, Issy les Moulineaux (FR)

(73) Assignee: THALES DIS FRANCE SAS, Meudon (FR)

( * ) Notice: Subject to any disclaimer, the term of this patent is extended or adjusted under 35 U.S.C. 154(b) by 256 days.

(21) Appl. No.: 18/580,754

(22) PCT Filed: Jul. 20, 2022

(86) PCT No.: PCT/EP2022/070339
§ 371 (c)(1),
(2) Date: Jan. 19, 2024

(87) PCT Pub. No.: WO2023/001885
PCT Pub. Date: Jan. 26, 2023

(65) Prior Publication Data
US 2025/0088356 A1 Mar. 13, 2025

(30) Foreign Application Priority Data
Jul. 22, 2021 (EP) .................................... 21306029

(51) Int. Cl.
*H04L 9/08* (2006.01)
*H04L 9/06* (2006.01)

(52) U.S. Cl.
CPC .......... *H04L 9/0866* (2013.01); *H04L 9/0656* (2013.01); *H04L 9/0869* (2013.01)

(58) Field of Classification Search
CPC ... H04L 9/0866; H04L 9/0656; H04L 9/0869; H04L 9/14; H04L 9/0637; H04L 2209/16
See application file for complete search history.

(56) References Cited

U.S. PATENT DOCUMENTS 10,855,473 B1 * 12/2020 Griffin .................. H04L 9/3239
11,139,964 B1 * 10/2021 Griffin ...................... H04L 9/50
(Continued)

OTHER PUBLICATIONS

International Search Report (PCT/ISA/210) and Written Opinion (PCT/ISA/237) mailed on Sep. 19, 2022, by the European Patent Office as the International Searching Authority for current International Application No. PCT/EP2022/070339 [13 pages].

*Primary Examiner* — Phy Anh T Vu

(57) ABSTRACT

Provided is a method for securely transferring data element values stored in a first device to a second device, where each stored data element value being encrypted with a storage key (KSi). It includes mutually agreeing on a short term session key (STK), determining, for each stored data element value an ephemeral key as a sub-sequence of a pseudorandom sequence (bsi) derived from the short term session key (STK), encrypting, each stored data element values using said ephemeral key, decrypting, each data element value encrypted with an ephemeral key, using the storage key (KSi), to obtain KSi-decrypted data element values, transferring said KSi-decrypted data element values from the first device to the second device, obtaining, by the second device, the ephemeral keys from the short term session key (STK), and decrypting the transferred data element values using the obtained ephemeral key.

11 Claims, 4 Drawing Sheets

(56) References Cited

U.S. PATENT DOCUMENTS

| | | | | |
|---|---|---|---|---|
| 11,301,847 | B1 * | 4/2022 | Chang | H04L 9/3231 |
| 11,310,207 | B1 * | 4/2022 | Davey | H04L 63/0428 |
| 11,405,387 | B1 * | 8/2022 | Griffin | H04L 9/0866 |
| 11,949,785 | B1 * | 4/2024 | Griffin | H04L 9/0894 |
| 2011/0238989 | A1 * | 9/2011 | Machani | H04L 9/3242 713/168 |
| 2017/0155628 | A1 | 6/2017 | Rohloff | |
| 2020/0007321 | A1 | 1/2020 | Doliwa | |
| 2020/0187004 | A1 * | 6/2020 | Reimer | H04L 63/083 |
| 2020/0226952 | A1 | 7/2020 | Lightowler | |
| 2020/0313860 | A1 * | 10/2020 | Junttila | H04L 9/0662 |
| 2021/0367767 | A1 * | 11/2021 | Saravanan | H04L 9/0844 |
| 2023/0108682 | A1 * | 4/2023 | Fu | G06F 21/6245 726/26 |
| 2024/0143834 | A1 * | 5/2024 | Khan | G06F 21/6254 |
| 2025/0088356 | A1 * | 3/2025 | Adjedj | H04L 9/0869 |

* cited by examiner

METHOD FOR SECURELY TRANSFERRING DATA ELEMENTS VALUES

FIELD OF THE INVENTION

The present invention relates to the field of cryptography and data protection, and of associated cryptographic devices, and more particularly to a method enabling to protect data stored on a first device from the beginning of their storage up to their transmission to a second device without sharing a long time key between the two devices.

BACKGROUND OF THE INVENTION

Digital systems are more and more used to store sensitive data that should be protected against access by any unauthorized user. Such sensitive data may for example be banking information, authentication data such as fingerprints or passwords, medical data . . .

Such data ore often protected by encryption against access by an unauthorized user. A plaintext piece of data may be protected by converting it into a ciphertext that may only be deciphered, i.e. converted back into the original data, by someone or some device owning a secret key required for performing the deciphering operation such that only a user having knowledge of a secret key needed to decipher the encrypted data can read it. Two major categories of cryptography are symetric key cryptography and private-key-public-key cryptography (herein, simply referred to as public key cryptography). In symmetric key cryptography, the same key is used to encrypt and decrypt data. In public key cryptography, the recipient of a ciphertext message, i.e., the decrypting party, has a private key or secret key required to decipher ciphertext messages encrypted with the public key. In other words, there is an association between a particular private key and a particular public key; they form a key pair.

In addition to being stored, such sensitive data often get to be shared by a first device storing it, with another distant device. For example, a user device running a banking application may share account data with a distant device in order to perform a transaction.

In such a case, sensitive data should also remain protected during their transmission from the first device to a second device and should not be transmitted in plaintext. When the transmitted data have been protected while being stored by encryption using a long term key, the second device receiving the data should know the long term key used to encrypt the data, or the corresponding decryption key in case of public key encryption, in order to be able to decipher the transmitted data and get access to it. Therefore, another data exchange must take place between the two devices in order to share between the two devices the long term key or key pair used for protecting the data.

Such a sharing of a long term key between multiple devices may pose an important threat to the security of the sensitive data. Indeed, if an attacker manages to get knowledge of the long-term secret key or key pair, for example by a Man-in-the-middle attack between the two devices, he will become able to decrypt and read any data stored by the devices and protected with the same long-term key.

Therefore, there is a need of a method enabling to store data at a first device and transmitting it to a second device, while ensuring the confidentiality of the data from the beginning of their storage up to their transmission to a second device without sharing a long time key between the two devices.

SUMMARY OF THE INVENTION

For this purpose and according to a first aspect, this invention therefore relates to a method for securely transferring data element values stored in a first device to a second device, each stored data element value being encrypted with a storage key, said method being performed by a system comprising the first device and the second device and comprising the steps of:

- mutually agreeing by the first and the second device on a short term session key,
- determining, by the first device, for each stored data element value an ephemeral key as a sub-sequence of a pseudorandom sequence (bsi) derived from the short term session key,
- encrypting, by the first device, each stored data element values using said ephemeral key,
- decrypting, by the first device, each data element value encrypted with an ephemeral key, using the storage key, to obtain KSi-decrypted data element values,
- transferring said KSi-decrypted data element values from the first device to the second device,
- obtaining, by the second device, the ephemeral keys from the short term session key,
- decrypting, by the second device, the transferred data element values using the obtained ephemeral key.

Such a method enables to change the key used for encrypting the data element values to be transmitted to the second device and then transmit it to the second device encrypted with a key known to the second device without ever exposing it in cleartext.

Each storage key may be derived from a long-term key and an initialization value.

It enables to encrypt each data with its own key without storing many different keys at the first device.

Said storage key may be derived by using a block-cipher algorithm in counter mode using the long-term key as a secret key and the initialization value as initial counter value.

Said storage key may be derived by using a Key derivation function based on Cipher based Message Authentication Code or keyed Hash Message Authentication Code wherein a label or context field includes the initialization value and the long-term key is used as secret key.

Said storage key may be derived from the long-term key and the initialization value by using a stream-cipher or a Pseudorandom Number Generator.

Said data element values DEi_Val are stored in the first device encrypted by a function sec using the storage key KSi such that:

$$\mathrm{sec}(\mathrm{DEi\_Val}) = \mathrm{DEi\_Val} \oplus KSi = (\mathrm{DEi\_Val}[0] \| \ldots \| \mathrm{DEi\_Val}[\mathrm{byte\_length}(\mathrm{DEi\_Val}) - 1]) \oplus (KSi[0] \| \ldots \| KSi[\mathrm{byte\_length}(\mathrm{DEi\_Val}) - 1]).$$

Said stored data element values may be encrypted by a function ephsec with said ephemeral key bs[j]||bs[j+1] || . . . ||bs[j+bytelength(DEi_Val)−1] such that:

$$ephsec(\mathrm{sec}(\mathrm{DEi\_Val})) = \mathrm{sec}(\mathrm{DEi\_Val}) \oplus (bs[j] \| bs[j+1] \| \ldots \| bs[j + \mathrm{bytelength}(\mathrm{DEi\_Val}) - 1]).$$

In an embodiment, the encryption and/or decryption by the first device or the second device is performed block per block.

The first device may be a mobile device and the second device may be a reader.

The data element values may be comprised in a mobile application and the long-term key may be stored on the mobile device.

The storage of the long-term key may be protected using white-box cryptography techniques.

According to a second aspect, this invention therefore relates also to a first device comprising a memory storing data element values encrypted with a storage key (KSi), a processor and an interface configured to perform:

- mutually agreeing with the second device on a short term session key,
- determining, for each stored data element value, an ephemeral key as a sub-sequence of a pseudorandom sequence derived from the short term session key,
- encrypting stored data element values using said ephemeral key,
- decrypting each data element value encrypted with said ephemeral key, using the storage key, to obtain KSi-decrypted data element values,
- transferring said KSi-decrypted data element values to the second device.

According to a third aspect, this invention therefore relates also to a system comprising a first device according to the second aspect and a second device, said system being configured to perform the steps of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

The invention aims at solving the issue of securely transferring to a second device data element values stored in a first device and each encrypted with its storage key KSi, without sharing the storage keys KSi, or the corresponding decryption key, with the second device.

In the rest of the description, the invention will be described assuming that all encryptions are performed using symmetric encryption protocols and symmetric keys. Of course, the invention also applies to asymmetric encryption protocols using public/private key pairs. As a result, any mention in the description of a key used for decryption may either refer to the same key as the one used for performing the corresponding encryption (in the case of symmetric encryption), or to the private key corresponding to a public key used for encryption (in the case of public key cryptography).

Figure 1:
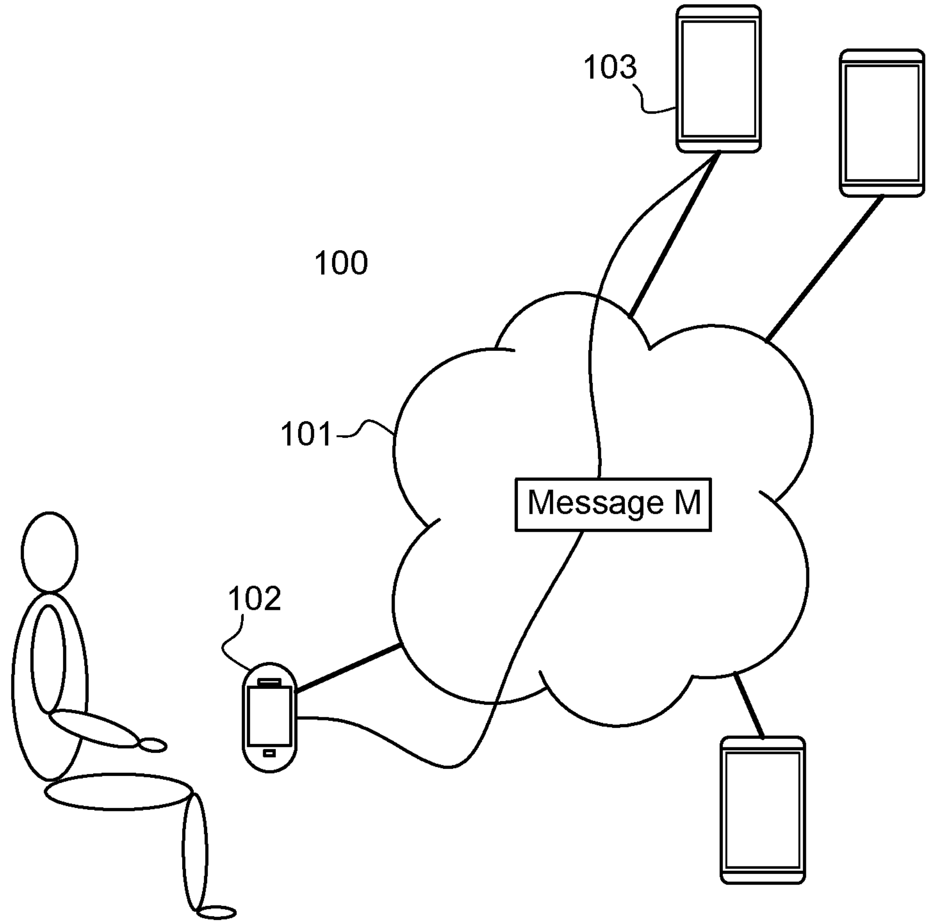
FIG. 1 is a schematic illustration of a system according to an embodiment of the present invention.

FIG. 1 is a schematic illustration of system 100 comprising a network 101 connecting the first device 102 storing the data element values DEi_Val with i in {1, . . . , n}, with n an integer, each data element value being encrypted with its storage key KSi, and the second device 103 requesting access to these data element values.

The first and the second devices may be any digital devices with processing and storage means such as smartcards, mobile phones, tablets, personal computers, server devices 3.

Figure 2:
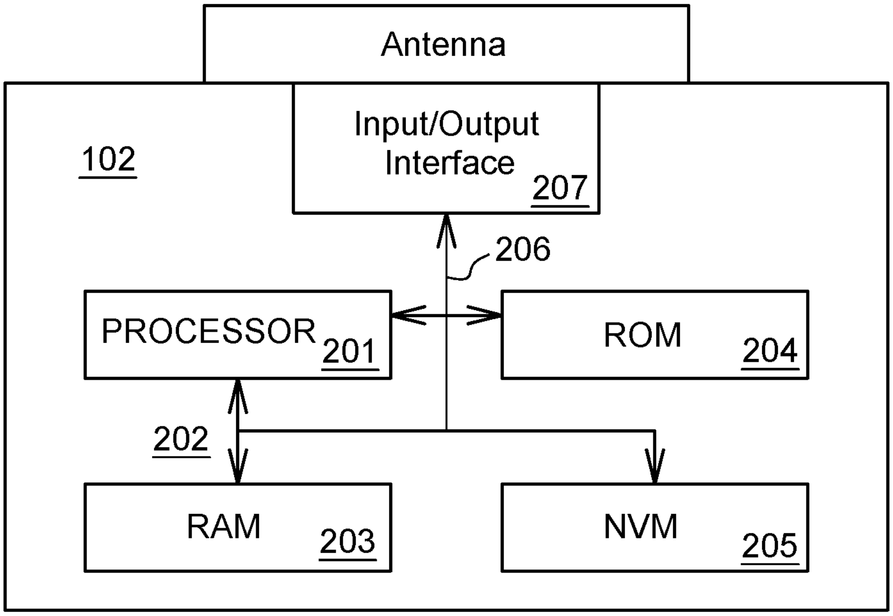
FIG. 2 is a schematic illustration of a first device according to an embodiment of the present invention.

FIG. 2 is a schematic illustration of the first device 102. The first device 102 may include a processor 201 connected via a bus 202 to a random access memory (RAM) 203, a read-only memory (ROM) 204, and/or a non-volatile memory (NVM) 205 storing the encrypted data element values. The first device 102 may further include a communication interface 206 by which the first device 102 may be connected to the network 101. Such an interface may be a wireless interface connected to an antenna and may be used to connect the first device 102 to various forms of wireless networks, e.g., wide-area networks, WiFi networks, or mobile telephony networks. Alternatively, such an interface may be a wired interface such as an Ethernet internet. The first device may also include input/output means 207 providing interfaces to a user of the first device, such as one or more screens, loudspeakers, a mouse, tactile surfaces, a keyboard etc. . . .

The second device 103 has the same kind of architecture and may include the same elements as the first device.

The data element values to be protected, encrypted and stored in the first device memory, may be any kind of sensitive data, such as identity data, banking information, cryptographic keys etc. . . .

In an embodiment, the first device stores secure documents s-doc comprising each a header, a footer, and data elements DEi composed of an identifier DEi_ID and a data element value DEi_Val with i in {1, . . . , n}, n being an integer: [s-doc_header] [DE1_ID][sec(DE1_Val)] [DE2_ID][sec(DE2_Val)] . . . [DEn_ID] [sec(DEn_Val)] [s-doc_footer] with || the concatenation operation. Such documents may for example be identity documents or healthcare documents.

In such an embodiment, the data element values DEi_Val are each stored encrypted with their storage key KSi, as indicated by the notation sec(DEi_Val). The first device may be a mobile device storing the secure documents and the second device may be a reader requesting access to these secure documents.

Each storage key KSi with i in {1, . . . , n}, n being an integer, may be derived from a long-term key LTK and an initialization value IVi. As an example, the identifier DEi_ID associated to a data element value DEi_Val may be used as initialization value IVi for generating the storage key KSi for this value.

As an example, when the first device is a mobile device, the stored data element values may be stored in a mobile application of the first device and the long-term key may be securely stored on the mobile device. The long-term key may for example be protected using white-box cryptography techniques.

Storage keys KSi may be derived from the long-term key LTK using a keystream derivation algorithm:

in a first example, a storage key KSi is derived by using a block-cipher algorithm in counter mode, such as AES-CTR, using the long-term key LTK as a secret key and the initialization value IVi as initial counter value;

in a second example, a storage key KSi is derived by using a Key derivation function (KDF) based on Cipher based Message Authentication Code (CMAC) or keyed Hash Message Authentication Code (HMAC) wherein a label or context field includes the initialization value IVi and the long-term key LTK is used as secret key;

in a third example, a storage key is derived from the long-term key LTK and the initialization value IVi using a stream-cipher or a Pseudo-Random Number Generator PRNG.

Figure 3:
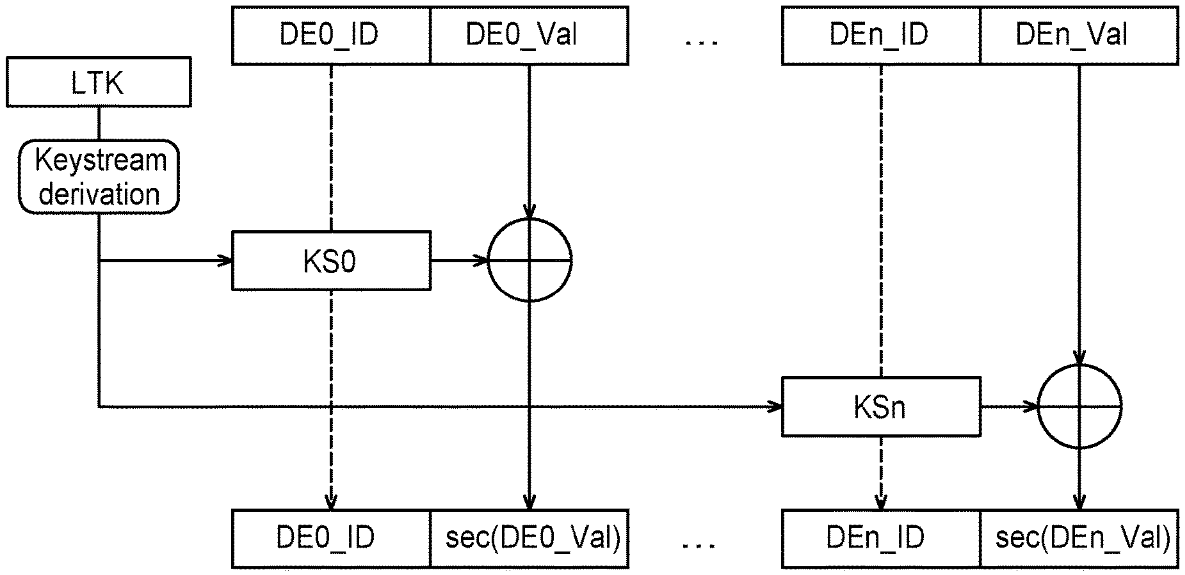
FIG. 3 illustrates schematically encryption of data element values with a storage key according to an embodiment of the present invention.

As shown on FIG. 3, each data element value DEi_Val with i in {1, . . . , n}, of length byte_length(DEi_Val), may be encrypted by a function sec with its storage key KSi by performing a bitwise XOR operation ⊕ with the storage key KSi, such that sec(DEi_Val)=DEi_Val⊕KSi=(DEi_Val[0]|| . . . ||DEi_Val[byte_length(DEi_Val)−1])⊕(KSi[0]|| . . . ||KSi[byte_length(DEi_Val)−1]), with || the concatenation operation.

In order to share data element values with the second device in a way that prevent an attacker from accessing it, the data element values shall be transmitted to the second device under an encrypted form, encrypted with a key that the second device can retrieve for decryption. In addition, they shall never appear in plaintext in any memory of the first device before their transmission to the second device. In order to do so, the main idea of the method according to the invention is to switch from an encryption of the data elements using the storage keys KSi to an encryption using an ephemeral key, only used for the transmission of these data elements, that both the first and the second device can derive from a shared secret key. In addition, this key switch is performed by first over-encrypting the data element values with the ephemeral key before removing the encryption of the data with the storage key KSi of the first device. In order to be able to remove the encryption of the data with the storage key KSi after over-encrypting the data element values with the ephemeral key, the cryptographic algorithm used for encrypting the data with the storage key KSi and then with the ephemeral key shall be a commutative encryption algorithm, such as for example SRA, Pohlig-Hellman algorithm, or a simple XOR with the encryption key.

Figure 4:
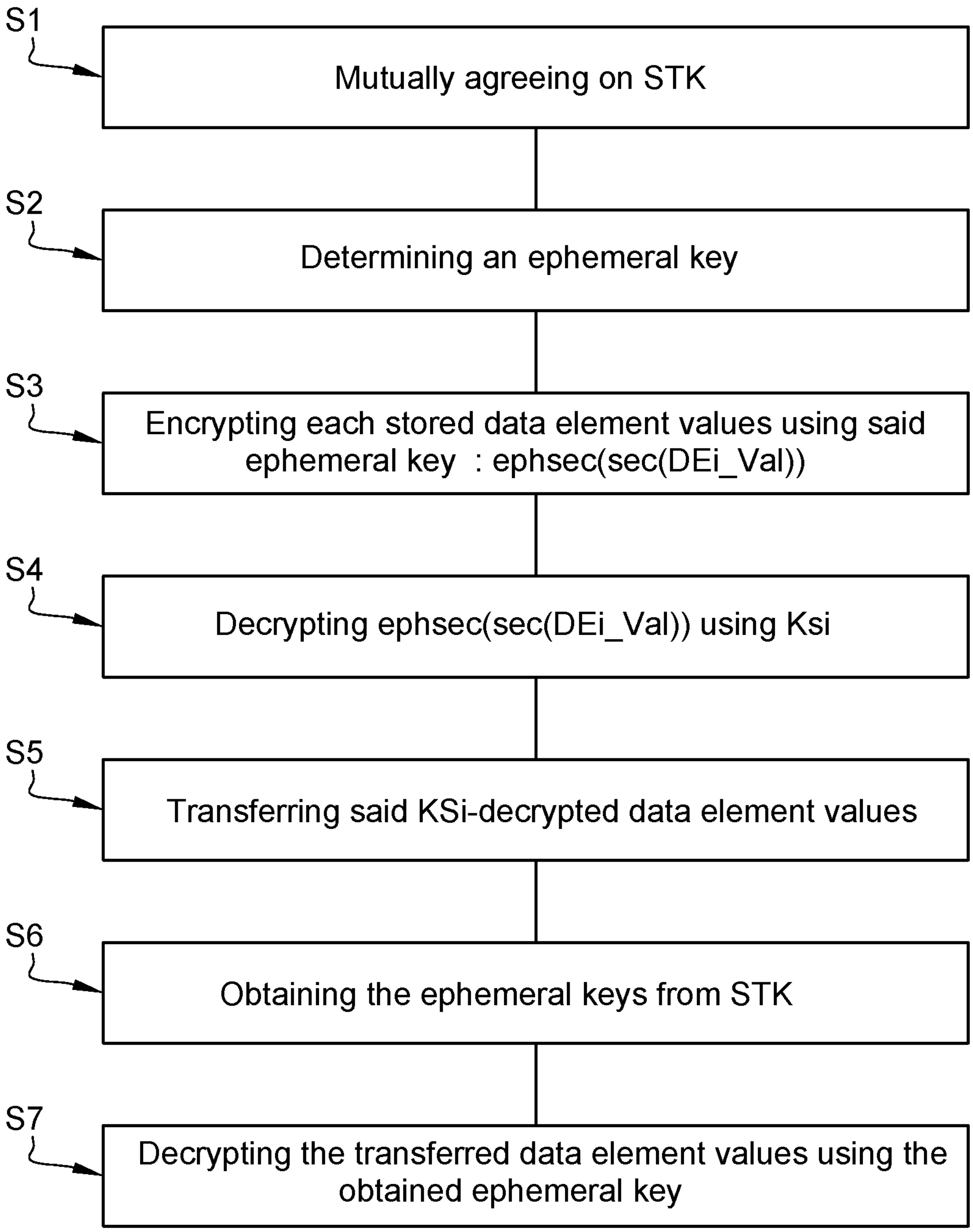
FIG. 4 illustrates schematically a method for securely transmitting to the second device data element values according to an embodiment of the present invention.
Figure 5:
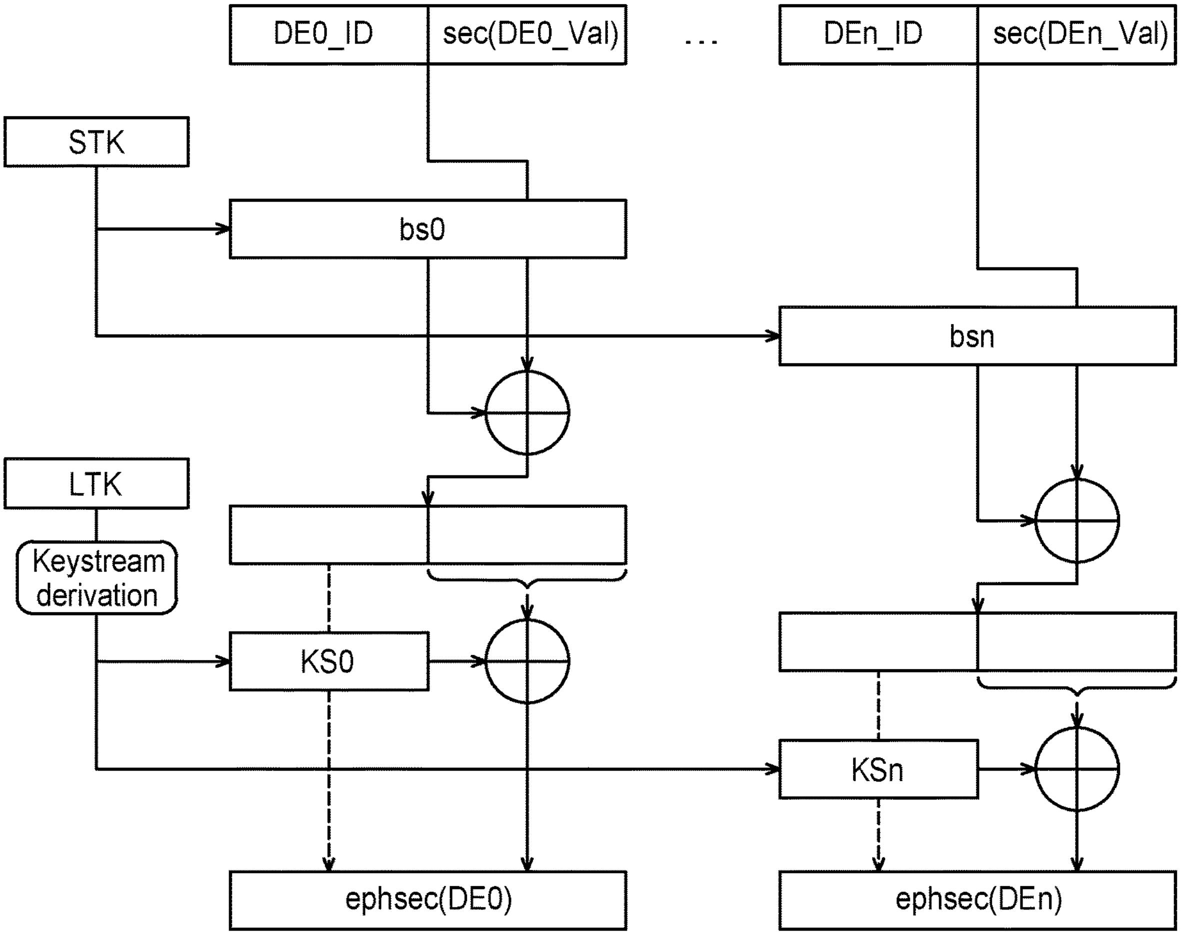
FIG. 5 illustrates schematically a transciphering of data element values according to an embodiment of the present invention.

The following paragraphs describe the steps of a method for securely transmitting to the second device such data element values DEi_Val with i in {1, . . . , n} each encrypted with a storage key KSi, as depicted on FIG. 4 and FIG. 5. In these paragraphs, examples are given in which encryption and decryption operations are performed by XOR operations with the keys. As described above, any other commutative cryptographic algorithm could be used.

In a first initialization step S1, the first device and the second device mutually agree on a short-term session key STK. In order to do so securely, they can set-up a secure channel and exchange information through this secure channel.

In a second initialization step S2, the first device determines for each stored data element value DEi_Val with i in {1, . . . , n}, n being an integer, an ephemeral key as a sub-sequence of a pseudorandom sequence bsi derived from the short term session key STK.

In a first encryption step S3, the first device encrypts each stored data element values sec(DEi_Val) by a function ephsec using said ephemeral key.

Such an encryption, noted ephsec in the following formula, may be performed by applying a bitwise XOR operation ⊕ with the ephemeral key using the following formula, with j the index of the bit of the pseudorandom sequence bsi selected to be used as starting bit of the ephemeral key:

$$ephsec(\text{sec}(\text{DEi\_Val})) = (\text{sec}(\text{DEi\_Val}[0])\|\ldots\|\text{sec}(\text{DEi\_Val}[\text{byte\_length}(\text{DEi\_Val})-1]))\oplus(bsi[j]\|\ldots\|bsi[j+\text{byte\_length}(\text{DEi\_Val})-1]),$$

with

|| the concatenation operation.

In a first decryption step S4, the first device decrypts each stored data element value encrypted with an ephemeral key using the storage key KSi, to obtain KSi-decrypted data element values.

When the stored data element values were encrypted with their storage key KSi by performing a bitwise XOR operation ⊕ with their storage key KSi, this bitwise XOR operation ⊕ with their storage key KSi is performed again.

The result of this step is the stored data element values encrypted with their ephemeral key only, noted (DEi_Val[0]|| . . . ||DEi_Val[byte_length(DEi_Val)−1])⊕(bsi[j]|| . . . ||bsi[j+byte_length(DEi_Val)−1]) when encryption with the ephemeral key is performed by applying a bitwise XOR operation ⊕, with || the concatenation operation.

In a transmission step S5, the first device transfers the KSi-decrypted data element values resulting from the first decryption step S4 to the second device.

In a second decryption step S6, the second device obtains the ephemeral keys from the short term session key STK.

In a third decryption step S7, the second device decrypts the transferred data element values using the obtained ephemeral keys. Therefore, it retrieves the data element values DEI_Val in plaintext.

In an embodiment, the encryption and/or decryption operations performed either by the first device or the second device are performed block per block in order to lower resources consumption.

In the examples above, encryption and decryption are performed by applying a XOR operation with a key. Alternatively, any other encryption may be used as long as it enables to remove from the output of the first encryption step S3 the encryption with the storage key without removing the encryption with the ephemeral key, in order to avoid to expose the data element values in cleartext.

The invention claimed is:

1. A method for securely transferring data element values (Dei_Val) in a first device to a second device comprising:

encrypting each of the data element values with a storage key (KSi) using a commutative cryptographic algorithm to obtain a plurality of encrypted data values, wherein each of storage keys (KSi) is different from one another and is derived from a long-term key (LTK) of the first device and an initialization value (IVi), storing the plurality of the encrypted data values at the first device;

in response to receiving a request from the second device to access the plurality of the encrypted data element values, mutually agreeing by the first and the second device on a short-term session key (STK) via a secure channel;

determining, by the first device, a plurality of ephemeral keys for the plurality of the encrypted data values, each of the plurality of the ephemeral keys is a sub-sequence of a pseudorandom sequence (bsi) derived from the short-term session key (STK);

encrypting, by the first device, using the commutative cryptographic algorithm, each of the plurality of the encrypted data element values with one of the plurality of the ephemeral keys data to obtain a plurality of doubly encrypted data element values;

decrypting, by the first device, each of the plurality of the doubly encrypted data element values, using a corresponding storage key (KSi) from the storage keys, to obtain KSi-decrypted data element values;

transferring said KSi-decrypted data element values from the first device to the second device;

obtaining, by the second device, from the short-term session key (STK), for each of the KSi-decrypted data element values, a corresponding ephemeral key; and decrypting, by the second device, each of the KSi-decrypted data element values using the corresponding ephemeral key obtained.

2. The method of claim 1, wherein each of the storage keys is derived by using a block-cipher algorithm in counter mode using the long-term key (LTK) as a secret key and the initialization value (IVi) as initial counter value.

3. The method of claim 1, wherein each of the storage keys is derived by using a Key derivation function (KDF) based on Cipher based Message Authentication Code (CMAC) or keyed Hash Message Authentication Code (HMAC) wherein a label or context field includes the initialization value (IVi) and the long-term key (LTK) is used as secret key.

4. The method of claim 1, wherein each of the storage keys is derived from the long-term key (LTK) and the initialization value (IVi) by using a stream-cipher or a Pseudorandom Number Generator (PRNG).

5. The method of claim 4, wherein each of the data element values DEi_Val is encrypted by a function sec using a storage key from the storage keys KSi, wherein the function sec is:

$$\text{sec(DEi\_Val)} = \text{DEi\_Val} \oplus KSi = (\text{DEi\_Val}[0] \| \ldots \| \text{DEi\_Val}[\text{byte\_length(DEi\_Val)} - 1]) \oplus (KSi[0] \| \ldots \| KSi[\text{byte\_length(DEi\_Val)} - 1]),$$

wherein byte_length(DEi_Val) is the length of DEi_Val in bytes, wherein the storage keys KSi and the data element values DEi with i in {1, . . . , n}, n being an integer.

6. The method of claim 5, wherein each of the plurality of the encrypted data element values is encrypted by a function ephsec with one of the plurality of the ephemeral keys $$bs[j] \| bs[j+1] \| \ldots \| bs[j + \text{bytelength(DEi\_Val)} - 1],$$

wherein the function *ephsec* is:

$$ephsec(\text{sec(DEi\_Val)}) = \text{sec(DEi\_Val)} \oplus (bs[j] \| bs[j+1] \| \ldots \| bs[j + \text{bytelength(DEi\_Val)} - 1]),$$

wherein bs is the pseudorandom sequence and bs[j] is the jth byte of the pseudorandom sequence, and j is an integer.

7. The method of claim 6, wherein encryption and/or decryption by the first device or the second device is performed block per block.

8. The method of claim 7, wherein the first device is a mobile device and the second device is a reader.

9. The method of claim 8, wherein the data element values are comprised in a mobile application and the long-term key (LTK) is stored on the mobile device.

10. The method of claim 9, wherein storage of the long-term key (LTK) is protected using white-box cryptography techniques.

11. A first device for securely transferring data element values to a second device comprising:

a processor and an interface configure to:

encrypt each of the data element values with a storage key (KSi) using a commutative cryptographic algorithm to obtain a plurality of encrypted data values, wherein each of storage keys (KSi) is different from one another and is derived from a long-term key (LTK) of the first device and an initialization value (IVi), store the plurality of the encrypted data values in memory of the first device;

in response to receiving a request from the second device to access the plurality of the encrypted data element values, mutually agree with the second device on a short-term session key (STK) via a secure channel;

determine a plurality of ephemeral keys for the plurality of the encrypted data values, each of the plurality of the ephemeral keys is a sub-sequence of a pseudorandom sequence (bsi) derived from the short-term session key (STK);

encrypt using the commutative cryptographic algorithm, each of the plurality of the encrypted data element values with one of the plurality of the ephemeral keys to obtain a plurality of doubly encrypted data element values;

decrypt each of the plurality of the doubly encrypted data element values using a corresponding storage key (KSi) from the storage keys, to obtain KSi-decrypted data element values;

transfer the KSi-decrypted data element values to the second device for decryption.

* * * * *